US012715204B2

(12) United States Patent
Wilson et al.

(10) Patent No.: US 12,715,204 B2
(45) **Date of Patent: *Aug. 25, 2026**

(54) POLYMER SAFETY GLAZING FOR VEHICLES

(71) Applicant: RO TECHNOLOGIES, LLC, Las Vegas, NV (US)

(72) Inventors: Stephen S. Wilson, Las Vegas, NV (US); Bart E. Wilson, Las Vegas, NV (US)

(73) Assignee: RO Technologies, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/829,894

(22) Filed: Sep. 10, 2024

(65) Prior Publication Data

US 2024/0424776 A1 Dec. 26, 2024

Related U.S. Application Data

(63) Continuation of application No. 18/182,274, filed on Mar. 10, 2023, now Pat. No. 12,109,788, which is a (Continued)

(51) Int. Cl.

*B32B 27/36* (2006.01)
*B32B 7/06* (2019.01)
*B32B 7/12* (2006.01)

(52) U.S. Cl.

CPC .............. *B32B 27/365* (2013.01); *B32B 7/06* (2013.01); *B32B 7/12* (2013.01); *B32B 27/36* (2013.01);

(Continued)

(58) Field of Classification Search

CPC ........... B32B 27/365; B32B 7/06; B32B 7/12; B32B 27/36; B32B 2255/10;

(Continued)

(56) References Cited

U.S. PATENT DOCUMENTS 1,337,036 A 4/1920 Bergmann
1,366,907 A 2/1921 Dunand (Continued)

FOREIGN PATENT DOCUMENTS

AU 2005244595 A1 7/2006
AU 2015277196 A1 1/2017

(Continued)

OTHER PUBLICATIONS

Examination Report for Australian Patent Application No. 2020278490; mailed Apr. 7, 2025.

(Continued)

*Primary Examiner* — John D Freeman
(74) *Attorney, Agent, or Firm* — Stetina Garred Brucker & Newboles

(57) ABSTRACT

A laminate includes a polycarbonate substrate and an ultraviolet hard coat film disposed on the polycarbonate substrate. The ultraviolet hard coat film may include a polyethylene terephthalate (PET) layer, an adhesive interposed between the PET layer and the polycarbonate substrate, and an exterior hard coat disposed on the PET layer opposite the polycarbonate substrate. The exterior hard coat may include UV stabilizers. The laminate may include additional ultraviolet hard coat films stacked on the ultraviolet hard coat film. The laminate may be thermoformed into the shape of a curved vehicle windshield.

20 Claims, 2 Drawing Sheets

Related U.S. Application Data continuation of application No. 17/644,018, filed on Dec. 13, 2021, now Pat. No. 11,848,919, which is a continuation of application No. 16/819,526, filed on Mar. 16, 2020, now Pat. No. 11,364,715.

(60) Provisional application No. 62/850,966, filed on May 21, 2019.

(52) U.S. Cl.
CPC ....... *B32B 2255/10* (2013.01); *B32B 2255/26* (2013.01); *B32B 2307/536* (2013.01); *B32B 2307/71* (2013.01); *B32B 2605/006* (2013.01)

(58) Field of Classification Search
CPC .......... B32B 2255/26; B32B 2307/536; B32B 2307/71; B32B 2605/006; B32B 2250/03; B32B 2307/412; B32B 2307/584; B32B 2307/738; B32B 27/08; B32B 2307/732; B32B 2605/08
See application file for complete search history.

(56) References Cited

U.S. PATENT DOCUMENTS 2,047,253 A * 7/1936 Brooks ............ B32B 17/10018 351/159.62
2,138,086 A 11/1938 Blodjer
2,248,331 A 7/1941 Blodjer
2,328,687 A 9/1943 Serr
2,339,280 A 1/1944 Madsen
2,354,415 A 7/1944 Woodard
2,461,604 A 2/1949 Huntsman
2,511,329 A 6/1950 Craig
2,546,117 A 3/1951 Whelan
2,563,125 A 8/1951 Malcom, Jr.
2,569,715 A 10/1951 Green
2,640,068 A 5/1953 Schaefer et al.
2,736,109 A 2/1956 Scholl
2,923,944 A 2/1960 Lindblom
2,963,708 A 12/1960 Herbine et al.
3,095,575 A 7/1963 Radov
3,298,031 A 1/1967 Harold
3,475,766 A 11/1969 Raschke
3,577,565 A 5/1971 Feldmann et al.
3,605,115 A 9/1971 Bohner
3,685,054 A 8/1972 Raschke
3,774,239 A 11/1973 Kotzar
3,785,102 A 1/1974 Amos
3,797,042 A 3/1974 Gager
3,810,815 A 5/1974 Welhart et al.
3,868,293 A 2/1975 Selph
3,937,863 A 2/1976 Moore
3,948,662 A 4/1976 Alston et al.
3,950,580 A 4/1976 Boudet
3,987,569 A 10/1976 Chase
4,063,740 A 12/1977 Mader
4,076,373 A 2/1978 Moretti
4,090,464 A 5/1978 Bishopp et al.
D249,597 S 9/1978 Dillon
4,138,746 A 2/1979 Bergmann
D254,638 S 4/1980 Bay, Jr.
4,204,231 A 5/1980 Permenter
4,248,762 A 2/1981 Hornibrook et al.
4,248,918 A 2/1981 Hornibrook et al.
4,268,134 A 5/1981 Gulati et al.
4,273,098 A 6/1981 Silverstein
4,301,193 A 11/1981 Zuk
4,332,861 A 6/1982 Franz et al.
4,333,983 A 6/1982 Allen
4,380,563 A 4/1983 Ayotte
4,528,701 A 7/1985 Smith
4,557,980 A 12/1985 Hodnett, III
4,582,764 A 4/1986 Allerd et al.
4,625,341 A 12/1986 Broersma
4,658,515 A 4/1987 Oatman
4,696,860 A 9/1987 Epperson
4,701,965 A 10/1987 Landis
4,716,601 A 1/1988 Mcneal
4,726,074 A 2/1988 Baclit et al.
4,729,179 A 3/1988 Quist, Jr.
4,769,265 A 9/1988 Coburn, Jr.
D299,767 S 2/1989 Hsin
4,842,919 A 6/1989 David et al.
4,850,049 A 7/1989 Landis et al.
4,852,185 A 8/1989 Olson
4,852,186 A 8/1989 Landis
4,853,974 A 8/1989 Olim
4,856,535 A 8/1989 Forbes
4,864,653 A 9/1989 Landis
4,867,178 A 9/1989 Smith
4,884,296 A 12/1989 Nix, Jr.
4,884,302 A 12/1989 Foehl
4,889,754 A 12/1989 Vargas
D306,363 S 2/1990 Stackhouse et al.
4,907,090 A 3/1990 Ananian
4,911,964 A 3/1990 Corbo
D307,065 S 4/1990 Friedman
4,920,576 A 5/1990 Landis
4,934,792 A 6/1990 Tovi
4,945,573 A 8/1990 Landis
4,950,445 A 8/1990 Salce et al.
D311,263 S 10/1990 Russell
4,964,171 A 10/1990 Landis
4,965,887 A 10/1990 Paoluccio et al.
4,973,511 A 11/1990 Farmer et al.
4,975,981 A 12/1990 Ray
5,000,528 A 3/1991 Kawakatsu
5,002,326 A 3/1991 Spicer et al.
D318,147 S 7/1991 Russell
5,035,004 A 7/1991 Koester
D319,449 S 8/1991 Millar
5,046,195 A 9/1991 Koritan
D321,268 S 10/1991 Nix, Jr.
5,052,054 A 10/1991 Birum
5,054,480 A 10/1991 Bare et al.
5,067,475 A 11/1991 Posnansky
5,071,206 A 12/1991 Hood et al.
H1023 H 3/1992 Wiseman
5,104,929 A 4/1992 Bilkadi
5,113,528 A 5/1992 Burke, Jr. et al.
5,162,046 A 11/1992 Mercado
D331,820 S 12/1992 Scanlon
D333,366 S 2/1993 Brown
5,183,700 A 2/1993 Austin
5,194,293 A 3/1993 Foster
5,201,077 A 4/1993 Dondlinger
5,206,956 A 5/1993 Olson
5,208,916 A 5/1993 Kelman
5,239,406 A 8/1993 Lynam
5,318,685 A 6/1994 O'Shaughnessy
D349,177 S 7/1994 Russell
D349,178 S 7/1994 Russell
5,327,180 A 7/1994 Hester, III et al.
D349,362 S 8/1994 Russell
5,364,671 A 11/1994 Gustafson
5,365,615 A 11/1994 Piszkin
D353,691 S 12/1994 Scanlon
D354,588 S 1/1995 Russell
D354,589 S 1/1995 Russell
5,420,649 A 5/1995 Lewis
D359,586 S 6/1995 Lofton
D361,160 S 8/1995 Russell
5,443,877 A 8/1995 Kramer et al.
D362,086 S 9/1995 Russell
5,468,247 A 11/1995 Matthai et al.
5,471,036 A 11/1995 Sperbeck
5,473,778 A 12/1995 Bell
5,486,883 A 1/1996 Candido
5,507,332 A 4/1996 McKinnon
5,510,173 A 4/1996 Pass et al.
5,512,116 A 4/1996 Campfield
5,523,132 A 6/1996 Zhang et al.

(56) References Cited

U.S. PATENT DOCUMENTS

RE35,318 E 8/1996 Warman
5,544,361 A 8/1996 Fine et al.
5,553,608 A 9/1996 Reese et al.
5,555,570 A 9/1996 Bay
5,557,683 A 9/1996 Eubanks
5,584,130 A 12/1996 Perron
5,592,698 A 1/1997 Woods
5,593,786 A 1/1997 Parker et al.
5,622,580 A 4/1997 Mannheim
5,633,049 A 5/1997 Bilkadi et al.
5,668,612 A 9/1997 Hung
5,671,483 A 9/1997 Reuber
5,673,431 A 10/1997 Batty
5,687,420 A 11/1997 Chong
5,694,650 A 12/1997 Hong
5,702,415 A 12/1997 Matthai et al.
5,709,825 A 1/1998 Shih
5,740,560 A 4/1998 Muoio
5,792,535 A 8/1998 Weder
5,806,102 A 9/1998 Park
5,815,848 A 10/1998 Jarvis
5,819,311 A 10/1998 Lo
5,846,659 A 12/1998 Loewer et al.
D404,849 S 1/1999 Desy
5,885,704 A 3/1999 Peiffer et al.
5,896,991 A 4/1999 Hippely et al.
5,924,129 A 7/1999 Gill
5,937,596 A 8/1999 Leeuwenburgh et al.
5,956,175 A 9/1999 Hojnowski
5,972,453 A 10/1999 Akiwa et al.
5,991,072 A 11/1999 Solyntjes et al.
5,991,081 A 11/1999 Haaland et al.
5,991,930 A 11/1999 Sorrentino
D418,256 S 12/1999 Caruana
6,008,299 A 12/1999 Mcgrath et al.
6,049,419 A 4/2000 Wheatley et al.
6,085,358 A 7/2000 Cogan
6,173,447 B1 1/2001 Arnold
6,217,099 B1 4/2001 Mckinney et al.
6,221,112 B1 4/2001 Snider
6,237,147 B1 5/2001 Brockman
6,250,765 B1 6/2001 Murakami
6,305,073 B1 10/2001 Badders
6,347,401 B1 2/2002 Joyce
6,375,865 B1 4/2002 Paulson et al.
6,378,133 B1 4/2002 Daikuzono
6,381,750 B1 5/2002 Mangan
6,385,776 B2 5/2002 Linday
6,388,813 B1 5/2002 Wilson et al.
6,403,005 B1 6/2002 Mientus et al.
6,416,872 B1 7/2002 Maschwitz
6,432,522 B1 8/2002 Friedman et al.
6,461,709 B1 10/2002 Janssen et al.
6,469,752 B1 10/2002 Ishikawa et al.
6,481,019 B2 11/2002 Diaz et al.
6,491,390 B1 12/2002 Provost
6,531,180 B1 3/2003 Takushima et al.
6,536,045 B1 3/2003 Wilson et al.
6,536,589 B2 3/2003 Chang
6,555,235 B1 4/2003 Aufderheide et al.
6,559,902 B1 5/2003 Kusuda et al.
6,576,349 B2 6/2003 Lingle et al.
6,584,614 B2 7/2003 Hogg
6,592,950 B1 7/2003 Toshima et al.
6,614,423 B1 9/2003 Wong et al.
6,622,311 B2 9/2003 Diaz et al.
D480,838 S 10/2003 Martin
6,654,071 B2 11/2003 Chen
6,660,389 B2 12/2003 Liu et al.
6,662,371 B2 12/2003 Shin
6,667,738 B2 12/2003 Murphy
6,739,718 B1 5/2004 Jung
6,745,396 B1 6/2004 Landis et al.
6,750,922 B1 6/2004 Benning
6,773,778 B2 8/2004 Onozawa et al.
6,773,816 B2 8/2004 Tsutsumi
6,777,055 B2 8/2004 Janssen et al.
6,800,378 B2 10/2004 Hawa et al.
6,838,610 B2 1/2005 De Moraes
6,841,190 B2 1/2005 Liu et al.
6,847,492 B2 1/2005 Wilson et al.
6,864,882 B2 3/2005 Newton
6,870,686 B2 3/2005 Wilson et al.
6,879,319 B2 4/2005 Cok
6,907,617 B2 6/2005 Johnson
6,911,593 B2 6/2005 Mazumder et al.
6,922,850 B1 8/2005 Arnold
6,952,950 B2 10/2005 Doe et al.
6,967,044 B1 11/2005 O'Brien
D512,797 S 12/2005 Canavan et al.
6,973,677 B2 12/2005 Diaz et al.
6,995,976 B2 2/2006 Richardson
7,070,837 B2 7/2006 Ross
7,071,927 B2 7/2006 Blanchard
D526,446 S 8/2006 Cowan et al.
7,097,080 B2 8/2006 Cox
7,101,810 B2 9/2006 Bond et al.
7,103,920 B1 9/2006 Otterson
7,143,979 B2 12/2006 Wood et al.
7,184,217 B2 2/2007 Wilson et al.
D541,991 S 5/2007 Lawrence
7,215,473 B2 5/2007 Fleming
7,226,176 B1 6/2007 Huang
7,238,401 B1 7/2007 Dietz
7,311,956 B2 12/2007 Pitzen
D559,442 S 1/2008 Regelbrugge et al.
7,344,241 B2 3/2008 Baek
7,351,470 B2 4/2008 Draheim et al.
D569,557 S 5/2008 Cho
7,389,869 B2 6/2008 Mason, Jr.
7,410,684 B2 8/2008 Mccormick
7,425,369 B2 9/2008 Oakey et al.
D586,052 S 2/2009 Elias
7,495,895 B2 2/2009 Carnevali
7,597,441 B1 10/2009 Farwig
7,629,052 B2 12/2009 Brumwell
7,631,365 B1 12/2009 Mahan
7,663,047 B2 2/2010 Hanuschak
7,709,095 B2 5/2010 Persoone et al.
7,722,921 B2 5/2010 Shimoda et al.
7,727,615 B2 6/2010 Kato et al.
7,735,156 B2 6/2010 VanDerWoude et al.
7,752,682 B2 7/2010 Vanderwoude et al.
7,812,077 B2 10/2010 Borade et al.
7,858,001 B2 12/2010 Qin et al.
7,937,775 B2 5/2011 Manzella, Jr. et al.
7,957,524 B2 6/2011 Chipping
8,024,818 B1 9/2011 Davenport
8,044,942 B1 10/2011 Leonhard et al.
8,101,277 B2 1/2012 Logan et al.
8,234,722 B2 8/2012 VanDerWoude et al.
8,261,375 B1 9/2012 Reaux
8,282,234 B2 10/2012 VanDerWoude et al.
8,292,347 B1 10/2012 Drake
8,294,843 B2 10/2012 Hollaway
8,316,470 B2 11/2012 McNeal et al.
8,361,260 B2 1/2013 Wilson et al.
8,407,818 B2 4/2013 VanDerWoude et al.
D683,077 S 5/2013 Klotz et al.
8,455,105 B2 6/2013 Hobeika et al.
D692,187 S 10/2013 Isobe
D692,189 S 10/2013 Isobe
8,567,596 B1 10/2013 Mason, Jr.
8,693,102 B2 4/2014 Wilson et al.
8,819,869 B2 9/2014 VanDerWoude et al.
8,889,801 B2 11/2014 Liao et al.
8,918,198 B2 12/2014 Atanasoff
8,974,620 B2 3/2015 Wilson et al.
D726,378 S 4/2015 Wako
8,999,509 B2 4/2015 Port et al.
9,023,162 B2 5/2015 Mccormick et al.
9,104,256 B2 8/2015 Wilson et al.
9,128,545 B2 9/2015 Wilson et al.
9,150,763 B2 10/2015 Lopez et al.

(56) References Cited

U.S. PATENT DOCUMENTS 9,161,858 B2 10/2015 Capers et al.
9,170,415 B2 10/2015 Mansuy
9,173,437 B2 11/2015 VanDerWoude et al.
9,204,823 B2 12/2015 Derenne et al.
9,274,625 B2 3/2016 Wilson et al.
9,295,297 B2 3/2016 Wilson
D759,900 S 6/2016 Cummings et al.
9,442,306 B1 9/2016 Hines et al.
9,471,163 B2 10/2016 Wilson et al.
9,526,290 B2 12/2016 Wilson
9,575,231 B2 2/2017 Chu et al.
D781,507 S 3/2017 Huh
D781,508 S 3/2017 Huh
9,629,407 B2 4/2017 Foster
9,671,622 B1 6/2017 Vetrini et al.
9,706,808 B2 7/2017 Sclafani et al.
9,726,940 B2 8/2017 Tomiyasu
D805,256 S 12/2017 Yang
9,905,297 B2 2/2018 Best
D815,190 S 4/2018 Dellemann
9,968,155 B2 5/2018 Wilson
10,070,678 B2 9/2018 Wilson
10,165,819 B2 1/2019 Klotz et al.
10,201,207 B2 2/2019 VanDerWoude et al.
10,226,095 B2 3/2019 Wilson
10,227,501 B2 3/2019 Hwang et al.
D849,240 S 5/2019 Guo et al.
D850,256 S 6/2019 Ryszawy
10,321,731 B2 6/2019 Wilson
10,345,934 B2 7/2019 Wilson et al.
10,384,084 B2 8/2019 Isham et al.
10,427,385 B2 10/2019 Wilson et al.
10,449,397 B2 10/2019 VanDerWoude et al.
10,520,756 B2 12/2019 Gallina et al.
10,537,236 B2 1/2020 Bennett et al.
D879,384 S 3/2020 Sato
D882,182 S 4/2020 Fekete
10,620,670 B2 4/2020 Wilson et al.
10,687,569 B1 6/2020 Mcdirmid
10,716,986 B2 7/2020 Winter et al.
10,871,661 B2 12/2020 Saylor et al.
10,874,163 B2 12/2020 VanDerWoude et al.
D907,299 S 1/2021 Brown, II et al.
D907,300 S 1/2021 Brown, II et al.
D925,129 S 7/2021 Wilson
D925,834 S 7/2021 Babin et al.
11,090,516 B2 8/2021 VanDerWoude et al.
11,141,959 B2 10/2021 Wilson et al.
11,147,323 B1 10/2021 Wilson
11,307,329 B1 4/2022 Wilson
11,480,801 B1 10/2022 Morris et al.
11,490,667 B1 11/2022 Wilson
11,510,718 B2 11/2022 Childers et al.
11,548,356 B2 1/2023 Wilson et al.
11,579,339 B2 2/2023 Thothadri et al.
11,709,296 B2 7/2023 Wilson et al.
11,723,420 B2 8/2023 Wilson et al.
11,807,078 B2 11/2023 Wilson et al.
11,912,001 B2 2/2024 Wilson et al.
11,988,850 B2 5/2024 Wilson et al.
12,077,037 B2 9/2024 Wilson et al.
12,162,330 B2 12/2024 Wilson et al.
2001/0035936 A1 11/2001 Maisnik
2002/0025441 A1 2/2002 Hieda et al.
2002/0036362 A1 3/2002 Chigira et al.
2002/0101411 A1 8/2002 Chang
2002/0109922 A1 8/2002 Wilson et al.
2002/0114934 A1 8/2002 Liu et al.
2002/0122925 A1 9/2002 Liu et al.
2002/0159159 A1 10/2002 Wilson et al.
2002/0195910 A1 12/2002 Hus et al.
2003/0012936 A1 1/2003 Draheim et al.
2003/0087054 A1 5/2003 Janssen et al.
2003/0110613 A1 6/2003 Ross
2004/0004605 A1 1/2004 David
2004/0109096 A1 6/2004 Anderson et al.
2004/0121105 A1 6/2004 Janssen et al.
2004/0139530 A1 7/2004 Yan
2004/0202812 A1 10/2004 Congard et al.
2004/0227722 A1 11/2004 Friberg et al.
2004/0238690 A1 12/2004 Wood et al.
2004/0246386 A1 12/2004 Thomas et al.
2004/0258933 A1 12/2004 Enniss et al.
2005/0002108 A1 1/2005 Wilson et al.
2005/0015860 A1 1/2005 Reaux
2005/0071909 A1 4/2005 Diaz et al.
2005/0133035 A1 6/2005 Yahiaoui et al.
2005/0180877 A1 8/2005 Usami et al.
2005/0186415 A1 8/2005 Mccormick et al.
2005/0188821 A1 9/2005 Yamashita et al.
2005/0200154 A1 9/2005 Barbee et al.
2005/0249957 A1 11/2005 Jing et al.
2005/0260343 A1 11/2005 Han
2006/0024494 A1 2/2006 Amano et al.
2006/0052167 A1 3/2006 Boddicker et al.
2006/0056030 A1 3/2006 Fukuda et al.
2006/0057399 A1 3/2006 Persoone et al.
2006/0114245 A1 6/2006 Masters et al.
2006/0138694 A1 6/2006 Biernath et al.
2006/0158609 A1 7/2006 Heil
2006/0177654 A1 8/2006 Shoshi
2006/0204776 A1 9/2006 Chen et al.
2006/0254088 A1 11/2006 Mccormick
2006/0285218 A1 12/2006 Wilson et al.
2007/0019300 A1 1/2007 Wilson et al.
2007/0181456 A1 8/2007 Kusuda et al.
2007/0211002 A1 9/2007 Zehner et al.
2007/0212508 A1 9/2007 Mase
2007/0229962 A1 10/2007 Mason
2007/0234592 A1 10/2007 Crates
2007/0234888 A1 10/2007 Rotolo De Moraes
2007/0286995 A1 12/2007 Li et al.
2008/0014446 A1 1/2008 Donea et al.
2008/0030631 A1 2/2008 Gallagher
2008/0030675 A1 2/2008 Dillon
2008/0055258 A1 3/2008 Sauers
2008/0118678 A1 5/2008 Huang et al.
2008/0151177 A1 6/2008 Wang
2008/0160321 A1 7/2008 Padiyath et al.
2008/0176018 A1 7/2008 Enniss et al.
2008/0192351 A1 8/2008 Miyagawa et al.
2008/0231979 A1 9/2008 Chen
2008/0256688 A1 10/2008 Bruce
2008/0286500 A1 11/2008 Sussner et al.
2008/0292820 A1 11/2008 Padiyath et al.
2009/0011205 A1 1/2009 Thiel
2009/0026095 A1 1/2009 Lofland et al.
2009/0054115 A1 2/2009 Horrdin et al.
2009/0086415 A1 4/2009 Chipping
2009/0087655 A1 4/2009 Yamada et al.
2009/0105437 A1 4/2009 Determan et al.
2009/0119819 A1 5/2009 Thompson
2009/0181242 A1 7/2009 Enniss et al.
2009/0233032 A1 9/2009 Craig
2009/0239045 A1 9/2009 Kato et al.
2009/0239048 A1 9/2009 Sugihara et al.
2010/0026646 A1 2/2010 Xiao et al.
2010/0033442 A1 2/2010 Kusuda et al.
2010/0102197 A1 4/2010 Mcintyre
2010/0102476 A1 4/2010 Higgins
2010/0122402 A1 5/2010 Tipp
2010/0146679 A1 6/2010 Heil
2010/0238119 A1 9/2010 Dubrovsky et al.
2010/0245273 A1 9/2010 Hwang et al.
2010/0270189 A1 10/2010 Pedersen, II et al.
2011/0007388 A1 1/2011 Wilson et al.
2011/0010994 A1 1/2011 Wilson et al.
2011/0012841 A1 1/2011 Lin
2011/0013273 A1 1/2011 Wilson et al.
2011/0014481 A1 1/2011 Wilson et al.
2011/0035936 A1 2/2011 Lee
2011/0052864 A1 3/2011 Son
2011/0097574 A1 4/2011 Faldysta et al.
2011/0119801 A1 5/2011 Wright

(56) References Cited

U.S. PATENT DOCUMENTS

2011/0165361 A1 7/2011 Sherman et al.
2011/0168261 A1 7/2011 Welser et al.
2011/0267793 A1 11/2011 Cohen et al.
2011/0271497 A1 11/2011 Suh et al.
2011/0277361 A1 11/2011 Nichol et al.
2011/0279383 A1 11/2011 Wilson et al.
2012/0003431 A1 1/2012 Huang
2012/0030095 A1 2/2012 Marshall et al.
2012/0047614 A1 3/2012 Choi
2012/0070603 A1 3/2012 Hsu
2012/0081792 A1 4/2012 Neuffer
2012/0137414 A1 6/2012 Saylor
2012/0149561 A1 6/2012 Ribi et al.
2012/0180204 A1 7/2012 Hawkins
2012/0183712 A1 7/2012 Leonhard et al.
2012/0188743 A1 7/2012 Wilson et al.
2012/0200816 A1 8/2012 Krasnov et al.
2012/0291173 A1 11/2012 Gleason et al.
2013/0045371 A1 2/2013 O'Donnell
2013/0083285 A1 4/2013 McNeal et al.
2013/0089688 A1 4/2013 Wilson et al.
2013/0098543 A1 4/2013 Reuter et al.
2013/0141693 A1 6/2013 McCabe et al.
2013/0145525 A1 6/2013 Arenson et al.
2013/0222913 A1 8/2013 Tomoda et al.
2013/0247286 A1 9/2013 Vanderwoude et al.
2013/0293959 A1 11/2013 Mcdonald
2014/0020153 A1 1/2014 Romanski et al.
2014/0050909 A1 2/2014 Choi et al.
2014/0220283 A1 8/2014 Wilson et al.
2014/0259321 A1 9/2014 Arnold
2014/0289937 A1 10/2014 Capers et al.
2015/0033431 A1 2/2015 Hofer Kraner et al.
2015/0103474 A1 4/2015 Cho
2015/0131047 A1 5/2015 Saylor et al.
2015/0202847 A1 7/2015 Johnson et al.
2015/0234209 A1 8/2015 Miyamoto et al.
2015/0258715 A1 9/2015 Ohta
2015/0294656 A1 10/2015 Hanuschak
2015/0309609 A1 10/2015 Wilson et al.
2015/0349147 A1 12/2015 Xi et al.
2015/0359675 A1 12/2015 Wilson
2016/0023442 A1 1/2016 Faris
2016/0050990 A1 2/2016 Hayes
2016/0073720 A1 3/2016 Niedrich
2016/0231834 A1 8/2016 Hardi
2016/0259102 A1 9/2016 Taka
2016/0271922 A1 9/2016 Uzawa et al.
2016/0291543 A1 10/2016 Saito
2016/0318227 A1 11/2016 Kim et al.
2017/0052286 A1 2/2017 Hines et al.
2017/0071792 A1 3/2017 Wilson et al.
2017/0079364 A1 3/2017 Paulson
2017/0129219 A1 5/2017 Uebelacker et al.
2017/0173923 A1 6/2017 Davis et al.
2017/0192131 A1 7/2017 Wilson et al.
2017/0208878 A1 7/2017 Kakinuma et al.
2017/0232713 A1 8/2017 Mannheim Astete et al.
2017/0281414 A1 10/2017 Wilson
2017/0299898 A1 10/2017 Gallina et al.
2017/0318877 A1 11/2017 Yahiaoui et al.
2018/0029337 A1 2/2018 Wilson et al.
2018/0042324 A1 2/2018 King
2018/0052334 A1 2/2018 Repko
2018/0094164 A1 4/2018 Ito et al.
2018/0148578 A1 5/2018 Ohta et al.
2018/0161208 A1 6/2018 Huh
2018/0229480 A1 8/2018 Chung
2018/0236753 A1 8/2018 Wykoff, II et al.
2018/0295925 A1 10/2018 Gagliardo et al.
2018/0338550 A1 11/2018 Boulware et al.
2019/0021430 A1 1/2019 Elliott
2019/0037948 A1 2/2019 Romanski et al.
2019/0116300 A1 4/2019 Okuno
2019/0118057 A1 4/2019 Winter et al.
2019/0209912 A1 7/2019 Isserow et al.
2019/0212474 A1 7/2019 Le Quang et al.
2019/0346591 A1 11/2019 Thothadri et al.
2019/0389182 A1 12/2019 Wilson et al.
2020/0100657 A1 4/2020 Lee et al.
2020/0115519 A1 4/2020 Phillips et al.
2020/0124768 A1 4/2020 Wilson
2020/0134773 A1 4/2020 Pinter et al.
2020/0154808 A1 5/2020 Inouye
2020/0178622 A1 6/2020 Jascomb et al.
2020/0247102 A1 8/2020 Wilson et al.
2020/0261055 A1 8/2020 Zwierstra et al.
2020/0281301 A1 9/2020 Wynalda, Jr.
2020/0310494 A1 10/2020 Ahn et al.
2020/0359718 A1 11/2020 Jefferis et al.
2020/0375272 A1 12/2020 Ulmer et al.
2020/0384747 A1 12/2020 Fukuda et al.
2021/0030095 A1 2/2021 Reicher
2021/0162645 A1 6/2021 Wilson et al.
2021/0283994 A1 9/2021 Wilson
2021/0298380 A1 9/2021 Brown, II et al.
2021/0298390 A1 9/2021 Sup, IV et al.
2021/0307425 A1 10/2021 Keim
2021/0315291 A1 10/2021 Votolato et al.
2021/0318553 A1 10/2021 Gharabegian
2021/0321692 A1 10/2021 Wilson
2021/0321693 A1 10/2021 Wilson et al.
2021/0329999 A1 10/2021 Ackerman
2021/0368886 A1 12/2021 Swart et al.
2021/0386155 A1 12/2021 Rose
2021/0393440 A1 12/2021 Leatt et al.
2021/0394427 A1 12/2021 Frisco et al.
2022/0015472 A1 1/2022 Boza
2023/0106407 A1 4/2023 Arima et al.

FOREIGN PATENT DOCUMENTS

CA 2386043 A1 11/2003
DE 3637188 A1 5/1988
DE 19808535 A1 9/1999
DE 202004010014 U1 4/2005
DE 202020101562 U1 4/2020
DE 202020101794 U1 4/2020
EP 192075 A2 8/1986
EP 671258 A2 9/1995
EP 1471415 A2 10/2004
EP 1517791 A2 3/2005
EP 1047537 B1 3/2010
EP 3157480 A1 4/2017
GB 2310862 A 9/1997
GB 2492574 A 1/2013
JP 61017860 A 1/1986
JP S6117860 A 1/1986
JP 62053832 A 3/1987
JP 04314537 A 11/1992
JP 06143496 A 5/1994
JP 07021456 A 1/1995
JP 10167765 A 6/1998
JP 2000334812 A 12/2000
JP 2002328613 A 11/2002
JP 2012183822 A 9/2012
JP 2014032222 A 2/2014
JP 2015128896 A 7/2015
JP 2018200329 A 12/2018
JP 6767596 B1 10/2020
KR 20120001292 A 1/2012
TW 200700793 A 1/2007
TW 201027992 A 7/2010
WO 0024576 A1 5/2000
WO 03052678 A1 6/2003
WO 2009008857 A1 1/2009
WO 2015009114 A1 1/2015
WO 2015091425 A1 6/2015
WO 2015093413 A1 6/2015
WO 2015195814 A1 12/2015
WO 2019006151 A1 1/2019

(56) References Cited

FOREIGN PATENT DOCUMENTS

| | | |
|---|---|---|
| WO | 2019055267 A1 | 3/2019 |
| WO | 2021176316 A1 | 9/2021 |

OTHER PUBLICATIONS

Prosecution History of U.S. Re-Examination U.S. Appl. No. 95/002,073 titled Touch Screen Protector; pp. 1-1,980.

Www.store.moshimode.com; “iVisor AG for iPad 2 Black”; 2004-2010.

Defendant’s Motion for Summary Judgment; Oct. 25, 2013; pp. 1-31.

Jake Gaecke; “Appletell Reviews the iVisor for iPad”; www.appletell.com; Sep. 15, 2010 at 12:32 p.m. www.technologytell.com/apple/60407/appletell-reviews-ag-for-ipad/; 2 pages.

Www.nushield.com/technology.php; “What Makes NuShield Screen Protectors Superior”, 2 pages.

Www.spigen.com; “Something You Want”; 2 pages.

Www.zagg.com; “Apple iPad 2 (Wi-Fi 3G) Screen Protector”; 2 pages.

Www.gadgetguard.com; “Invisible Gadget Guard, the Original”; 1 page.

Www.incipotech.com; “Protect Your iPhone 4 with Screen Protectors from Incipo”; 3 pages.

Www.store.moshimonde.com; “iVisor AG iPad Screen Protector”; Jul. 2010; 7 pages.

Www.store.moshimonde.com; “iVisor XT Crystal Clear Protector for iPad”; Aug. 2010; 3 pages.

Www.store.moshimonde.com; “iVisor AG for iPad 2 Black”; Mar. 2011; 5 pages.

Www.store.moshimonde.com; “iVisor AG for iPad 2 White”; Mar. 2011; 3 pages.

Www.store.moshimonde.com; “iVisor AG for iPhone 4/4S Black”; Nov. 2010; 5 pages.

Www.store.moshimonde.com; “iVisor AG for iPhone 4/4S White”; May 2010; 4 pages.

Dictionary.com (http://dictionary.reference.com) 2012.

*Racing Optics, Inc.* v. *Aevoe, Inc., d/b/a/ MOSHI*; Case No. 15-cv-017744-JCM-VCF; Aevoe’s Initial Disclosure Non-Infringement, Invalidity and Unenforceability Contentions (Redacted) dated Jan. 7, 2016.

Defendant Aevoe Corp.’s Non-Infringement Contentions and Responses to Racing Optic’s Disclosure of Asserted Claims and Infringement Contentions (U.S. Pat. No. 9,128,545) dated Jan. 7, 2016.

Defendant Aevoe Corp.’s Non-Infringement Contentions and Responses to Racing Optic’s Disclosure of Asserted Claims and Infringement Contentions (U.S. Pat. No. 9,104,256) dated Jan. 7, 2016.

Defendant Aevoe Corp.’s Non-Infringement Contentions and Responses to Racing Optic’s Disclosure of Asserted Claims and Infringement Contentions (U.S. Pat. No. 8,974,620) dated Jan. 7, 2016.

*I-Blason LLC* v. *Aevoe, Inc. and Aevoe Corp.*; Case IPR2016-TBA; Petition for Inter Partes Review of U.S. Pat. No. 8,044,942 (including Exhibits 1001-1019).

Dupont Teijin Films, “Mylar Polyester Film—Optical Properties”, Jun. 2003, 2 pages.

Https://en.wikipedia.org/wiki/Black_body, “Black Body”, Jul. 2009, 11 pages.

Https://en.wikipedia.org/wiki/Infrared, “Infrared”, Jul. 2009, 12 pages.

Https://en.wikipedia.org/wiki/BoPET, “PET Film (biaxially oriented)”, Jul. 2009, 4 pages.

Instashield LLC, Bionic Wrench® Inventor Creates Low-Cost Face Shield For Masses, Apr. 15, 2020, 3 pages.

Tom Zillich, Surrey manufacturer hopes to hit home run with face shield that clips to baseball cap, Apr. 29, 2020, 3 pages.

OPENTIP, Opromo Safety Face Shield Visor for Adult Kids, Protective Cotton Hat with Removable PVC Face Cover <https://www.opentip.com/product.php?products_id=11699030>, May 5, 2020, 3 pages.

Hefute, Hefute 5 PCS Protective Face Cover with Shield Comfortable Full Protection Face Compatiable with Glasses Anti-Droplet Anti-Pollution and Windproof Transparent Safety Face Cover with Shield(Style B) <https://www.amazon.com/dp/B086GSG8DH/ref=sspa_dk_detail_9?psc=1&pd_rd_i=B086GSG8DH&pd_rd_w=Ocdm2&pf_rd_p=48d372c1-f7e1-4b8b-9d02-4bd86f5158c5&pd_rd_wg=qkB2b&pf_rd_r=M%E2%80%A6>, May 6, 2020, 7 pages.

Geanbaye, Geanbaye Safety Full Face Shield Cap Detachable Baseball Cap Anti-Saliva Anti-Spitting Eye Protective Hat Windproof Dustproof <https://www.amazon.com/dp/B086DV32B8/ref=sspa_dk_detail_8?psc=1&pd_rd_i=B086DV32B8&pd_rd_w=MwjfT&pf_rd_p=48d372c1-f7e1-4b8b-9d02-4bd86f5158c5&pd_rd_wg=pxuOs&pf_rd_r=PNDA%E2%80%A6>, May 5, 2020, 8 pages.

Leigh Buchanan, These 2 Companies Are Making Face Shields for Everyone <https://www.inc.com/leigh-buchanan/face-shields-coronavirus-protection-open-source.html>, May 6, 2020, 8 pages.

Brim Shield, photographs, Apr. 21, 2020, 1 pages.

Hatshield, Shield Yourself With The Hatshield <https://www.hatshield.com/?gclid=CjwKCAjwp-X0BRAFEiwAheRui1u89v_3URuiwEVvBRGa9TaEfWoZVMJXRkWsZgPTUw-0fHJ5HD-8uhoCc84QAvD_BwE>, Apr. 17, 2020, 11 pages.

Eli N. Perencevich, Moving Personal Protective Equipment Into the Community Face Shields and Containment of COVID-19, Apr. 29, 2020, 2 pages.

Chang, Tian-Ci; Cao, Xun; Bao, Shan-Hu; Ji, Shi-Dong; Luo, Hong-Jie; Jin, Ping; Review of Thermochromic Vanadium Dioxide Based Smart Coatings: From Lab to Commercial Application; Dec. 16, 2017.

Saudi Basic Industries Corporation (SABIC); “The Department of Transportation [DOT] Guidebook”; Oct. 2016.

Hostaphan RBB, “Transparent, Temperature Stable Polyester Film for Cooking & Roasting Bags” Jul. 2016.

Hostaphan Win, “White, Long-Term Stable, Thermally Stable Polyester Film for PV Back Sheet Laminates”; Jul. 2016.

PCT Search Report & Written Opinion for PCT/US2019/054565 (Dec. 20, 2019).

PCT Search Report & Written Opinion for PCT/US2015/036248 (Sep. 16, 2015).

“Declaration of Jerome Aho”; Filed Aug. 3, 2007; Case 3:07-cv-00221-FDW-DCK; Includes: Exhibit A, Nascar Postcard (1 page), Exhibit B, 50th Anniversary Nascar letter sent Jan. 7, 1998 (1 page), and Exhibit C, Front page of “The Official Nascar Preview and Press Guide” (1 page); 9 pages.

*Racing Optics, Inc.* v. *David Leon O’Neal, Edward M. Wallace and Clear View Racing Optics, LLC*; Case 3:07 CV 221; Includes: Exhibit A, Wilson et al. U.S. Pat. No. 6,847,492; and Exhibit B, Wilson et al. U.S. Pat. No. 7,184,217; 34 pages.

International Search Report; International Application No. PCT/US99/95128; Date of Completion: Jan. 18, 2000; 54 pages.

International Search Report; International Application No. PCT/US02/10971; Date of Completion: Nov. 20, 2002; 3 pages.

International Search Report; International Application No. PCT/US03/16284; Date of Completion: Mar. 9, 2004; 3 pages.

European Search Report for Application No. 15809930.9-107 / 3157480 (Dec. 15, 2017).

Canadian Office Action for Application Serial No. 2,952,436 (Nov. 15, 2019).

Canadian Office Action for Application Serial No. 2,952,436 (May 3, 2019).

Australian Examination Report for Application Serial No. 2015277196 (Oct. 18, 2018).

Www.wikipedia.org, Refractive Index, Oct. 31, 2014.

*Racing Optics, Inc.* v. *Aevoe Corp. DBA Moshi*; Case 2:15-cv-01774-RCJ-VCF; “Answer to Aevoe’s Counterclaims—Jury Trial Demanded”; Nov. 2, 2015; 15 pages.

Gregory Brower et al.; “Complaint for Patent Infringement”; Sep. 15, 2015; 15 pages.

Jeffrey A. Silverstri et al.; “Answer to Complaint for Patent Infringement”; Oct. 7, 2015; 59 pages.

United States Patent and Trademark Office; Office Action for U.S. Appl. No. 15/090,681; Aug. 26, 2016; 8 pages.

List of References for U.S. Appl. No. 15/090,681; Receipt date Jun. 30, 2016; 3 pages.

(56) References Cited

OTHER PUBLICATIONS

List of References for U.S. Appl. No. 15/090,681; Receipt date Apr. 27, 2016; 4 pages.
Examiner's search strategy and results for U.S. Appl. No. 15/090,681; Aug. 21, 2016; 2 pages.
*Aevoe Corp.* v. *Racing Optics, Inc.*; Case No. IPR2016-01164; Petition for Inter Partes Review of U.S. Pat. No. 9,104,256 (including Exhibits 1001-1011 and Petitioner Power of Attorney Pursuant to 37 C.F.R. 42. 10(b) for Petition for Inter Partes Review); Jun. 21, 2016.
*Aevoe Corp.* v. *Racing Optics, Inc.*; Case No. IPR2016-01165; Petition for Inter Partes Review of U.S. Pat. No. 9,128,545(including Exhibits 1001-1006 and Petitioner Power of Attorney Pursuant to 37 C.F.R. 42. 10(b) for Petition for Inter Partes Review); Jun. 21, 2016.
*Aevoe Corp.* v. *Racing Optics, Inc.*; Case No. IPR2016-01166; Petition for Inter Partes Review of U.S. Pat. No. 9,274,625 (including Exhibits 1001-1011 and Petitioner Power of Attorney Pursuant to 37 C.F.R. 42. 10(b) for Petition for Inter Partes Review); Jun. 21, 2016.
Exhibit 1—Invalidity Contentions re: '545 Patent Under LPR 1-8(b)-(d); at least as early as Jul. 1, 2016.
Exhibit 2—Invalidity Contentions re: '256 Patent Under LPR 1-8(b)-(d); at least as early as Jul. 1, 2016.
Exhibit 3—Invalidity Contentions re: '620 Patent Under LPR 1-8(b)-(d); at least as early as Jul. 1, 2016.
Exhibit 4—Invalidity Contentions re: '625 Patent Under LPR 1-8(b)-(d); at least as early as Jul. 1, 2016.
Exhibit 1002—U.S. Pat. No. 5,364,671 to Gustafson; Case IPR2016-01745; Inter Partes Review of U.S. Pat. No. 8,974,620; at least as early as Sep. 7, 2016; pp. 1-6.
Exhibit 1004—U.S. Pat. No. to Draheim et al; Case IPR2016-01745; Inter Partes Review of U.S. Pat. No. 8,974,620; at least as early as Sep. 7, 2016; pp. 1-15.
Exhibit 1001—U.S. Pat. No. 8,974,620 to Wilson et al.; Case IPR2016-01745; Inter Partes Review of U.S. Pat. No. 8,974,620; at least as early as Sep. 7, 2016; pp. 1-15.
Exhibit 1003—U.S. Pat. No. 6,250,765 to Murakami; Case IPR2016-01745; Inter Partes Review of U.S. Pat. No. 8,974,620; at least as early as Sep. 7, 2016; p. 1-8.
Exhibit 1005—U.S. Pat. No. 7,957,524 to Chipping; Case IPR2016-01745; Inter Partes Review of U.S. Pat. No. 8,974,620; at least as early as Sep. 7, 2017; pp. 1-20.
Aevoe Corp., Racing Optics, Inc.; Petition for Inter Partes Review; Case IPR2016-01745; Inter Partes Review of U.S. Pat. No. 8,974,620; at least as early as Sep. 7, 2016; pp. 1-55.
Exhibit 1006—Japanese Application No. JP 2002-328613 to Kitaguchi Translation; IPR2016-01745; at least as early as Sep. 7, 2016; pp. 1-10.
Exhibit 1009—U.S. Appl. No. 13/838,311; Interview Summary; Case IPR2016-01745; Inter Partes Review of U.S. Pat. No. 8,974,620; at least as early as Sep. 7, 2016; p. 1-3.
Exhibit 1010—U.S. Appl. No. 15/838,311; Notice of Allowance; Case IPR2016-01745; Inter Partes Review of U.S. Pat. No. 8,974,620; at least as early as Sep. 7, 2016; pp. 1-8.
*Aevoe Corp.* v. *Racing Optics, Inc.*; Declaration of Darran Cairns; Case IPR2016-01745; Inter Partes Review of U.S. Pat. No. 8,974,620; at least as early as Sep. 7, 2016; pp. 1-32.
*Aevoe Corp.* v. *Racing Optics, Inc.*; Petitioner's Power of Attorney; Case IPR2016-01745; Inter Partes Review of U.S. Pat. No. 8,974,620; at least as early as Sep. 7, 2016; pp. 1-3.
Exhibit 1007—U.S. Appl. No. 13/838,311; Response to Office Action; Case IPR2016-01745; Inter Partes Review of U.S. Pat. No. 8,974,620; at least as early as Sep. 7, 2016; p. 1-19.
Exhibit 1008—U.S. Appl. No. 13/838,311; Response and Request for Continued Examination; Case IPR2016-01745; Inter Partes Review of U.S. Pat. No. 8,974,620; at least as early as Sep. 7, 2016; pp. 1-21.
*Aevoe Corp.* v. *Racing Optics, Inc.*; Mandatory Notices; Case IPR2016-01745; Inter Partes Review of U.S. Pat. No. 8,974,620; at least as early as Sep. 7, 2016; pp. 1-4.
*Aevoe Corp.* v. *Racing Optics, Inc.*; Power of Attorney; Case IPR2016-01745; Inter Partes Review of U.S. Pat. No. 8,974,620; at least as early as Sep. 7, 2016; pp. 1-4.
*Aevoe Corp* v. *Racing Optics, Inc.*; Notice of Filing Date; Case IPR2016-01745; Inter Partes Review of U.S. Pat. No. 8,974,620; at least as early as Sep. 6, 2016; p. 1-5.
*Aevoe Corp* v. *Racing Optics, Inc.*; Decision; Case IPR2016-01164; Inter Partes Review of U.S. Pat. No. 9,104,256; at least as early as Nov. 7, 2016; p. 1-24.
*Aevoe Corp* v. *Racing Optics, Inc.*; Decision; Case IPR2016-01166; Inter Partes Review of U.S. Pat. No. 9,274,625; at least as early as Nov. 7, 2016; p. 1-23.
*Aevoe Corp* v. *Racing Optics, Inc.*; Decision; Case IPR2016-01165; Inter Partes Review of U.S. Pat. No. 9,128,545; at least as early as Nov. 7, 2016; p. 1-25.
Settlement and License Agreement, Dec. 21, 2007, 28 pgs.
United States Patent and Trademark Office; Office Action dated Dec. 21, 2016 pertaining to U.S. Appl. No. 15/090,681, filed Apr. 5, 2016; 8 pages.
PCT Search Report and Written Opinion for US2020/016245 (Apr. 28, 2020).
Professional Plastics (http://www.professionalplastics.com/MelinexPETFilmDupont) 2012.
Whitney, Frank D., Preliminary Injunction, Aug. 21, 2007, 5 pgs.
Higgins, John P., Answer and Counterclaims to First Amended Complaint, Sep. 4, 2007, 27 pgs.
Ballato, John, Expert Report of John Ballato, Ph.D., Nov. 12, 2007, 5 pgs.
Russell, Geoffrey A., Rebuttal Report of Geoffrey A. Russell, Ph.D., on issues raised in the Export Report of John Ballato, Ph.D., Nov. 21, 2007, 15 pgs.
Higgins, John P., Defendants' Second Supplement to Its Response to Plaintiffs' First Set of Interrogatories, Dec. 7, 2007, 25 pgs.
Barnhardt, John J. III, Redacted Version Defendants' Memorandum in Support of Motion for Partial Summary Judgment, Dec. 3, 2007, 36 pgs.
Higgins, John P., Defendants' Second Supplement to its Response to Plaintiffs' First Set of Interrogatories, Dec. 7, 2007, 26 pgs.
Whitney, Frank D., Consent Judgment Order, Jan. 3, 2008, 5 pgs.
Ballato, John, Supplemental Expert Report of John Ballato, Ph.D., Nov. 19, 2007, 10 pgs.
Moore, Steven D., Plaintiffs' Motion to Strike Defendants' New and Untimely Invalidity Theory, Dec. 19, 2007, 3 pgs.
Moore, Steven D., Plaintiffs' Brief in Support of Motion to Strike Defendants' New and Untimely Invalidity Theory, Dec. 19, 2007, 10 pgs.
Barnhardt, John J. III, Notice Pursuant to 35 U.S.C. 282, Dec. 18, 2007, 3 pgs.
Office Action for Canadian Patent Application No. 2,952,436; Jul. 8, 2020.
Www.wikipedia.org. "Black Body", Jul. 2009, 11 pages.
Www.wikipedia.org. "Infrared", Jul. 2009, 12 pages.
Www.wikipedia.org. "PET Film (biaxially oriented)", Jul. 2009, 4 pages.
PCT International Application No. PCT/US99/25128 with International Search Report, Date of Completion Jan. 18, 2000, 54 Pages.
English translation of TW201027992, "Monitor Protection Device for a Flat Panel Display", 11 pgs.
Pulse Racing Innovations, EZ Tear Universal Single Pull Tearoff Ramp, webpage <https://www.pulseracinginnovations.com>, Dec. 30, 2020, 6 pages.
PCT International Search Report and Written Opinion for International Application No. PCT/US20/24639, Jun. 11, 2020, 13 pages.
PCT International Search Report and Written Opinion for International Application No. PCT/US2020/049919; Nov. 27, 2020.
Tian-Chi Chang, Xun Cao, Shan-Hu Bao, Shi=Dong Ji, Hong-Jie Luo, Ping Jin; "Review on Thermochromic Vanadium Dioxide Based Smart Coatings: From Lab to Commercial Application"; Dec. 16, 2017.

(56) References Cited

OTHER PUBLICATIONS

PCT International Search Report and Written Opinion for International Application No. PCT/US2020/062230; Feb. 8, 2021.
"Anti-reflective coating," Wikipedia, last updated Jul. 13, 2017 by Andy Dingley, <https://en.m.wikipedia.org/wiki/Anti-reflective_coating>.
"Monotonic function," Wikipedia, accessed May 24, 2017, <https://en.wikipedia.org/wiki/Monotonic_function>.
"Thin Film," Wikipedia, last updated Jun. 20, 2017, <https://en.wikipedia.org/wiki/Thin_film>.
"Tips to Get Quality Anti-Reflection Optical Coatings," Penn Optical Coatings, accessed May 24, 2017, <http://www.pennoc.com/tipsgetqualityantireflectionopticalcoatings/>.
Langlet, M., "Antireflective Films", from Chapter 15 of Handbook of Sol-Gel Science and Technology Processing Characterization and Applications, copyright 2005, pp. 332-334, 337, 339-341., taken from website <https://books.google.com/books?id=i9swy1D2HxIC&lpg=PA339&dq=AR%20thick%20film%20coatings&pg=PA339#v=onepage&q=AR%20thick%20film%20coatings&f=false>.
Li, H.-M. et al., "Influence of weight ratio in polymer blend film on the phase separation structure and its optical properties", The European Physical Journal Applied Physics, 45, 20501, published Jan. 31, 2009, EDP Sciences, 4 pages.
MDS Nordion, "Gamma Compatible Materials," Datasheet, Aug. 2007, 4 pages, <https://ab-div-bdi-bl-blm.web.cern.ch/Radiation/Gamma_Compatible_Materials_List_company.pdf>, retrieved on Sep. 29, 2021.
Zhang, Xin_Xiang et al., Abstract of "One-step sol-gel preparation of PDMS-silica ORMOSILs as environment-resistant and crack-free thick antireflective coatings," Journal of Materials Chemistry, Issue 26, 2012, <http://pubs.rsc.org/en/content/articlelanding/2012/m/c2jm31005h#!divAbstract>.
PCT International Search Report and Written Opinion for International Application No. PCT/US2017/044438, dated Oct. 23, 2017, 12 pages.
Chemical Book, "Benzophenone", https://www.chemicalbook.com/Chemical ProductProperty_EN_CB57 44679.htm, available at least as of 2017, accessed on line on Dec. 15, 2021 (Year: 2017).
Chemical Book, "Polymethylhydrosiloxane", https://www.chemicalbook.com/Chemical ProductProperty _En_ CB3694969.htm, available at least as of 2017, accessed online on Dec. 15, 2021 (Year: 2017).
Guide Chem, "UV Stabilizer", https://wap.guidechem.com/trade/uv-stabilizer-uv-absorber-ligh-id3578792.html, available at least as of 2018, accessed online on Dec. 15, 2021 (Year: 2018).
Hostaphan RBB biaxially oriented film data sheet (Year: 2011).
PCT International Search Report and Written Opinion for International Application No. PCT/US2020/024639; Jun. 11, 2020.
PCT International Search Report and Written Opinion for International Application No. PCT/US2021/026165, dated Jul. 9, 2021, 10 pages.
PCT International Search Report and Written Opinion for International Application No. PCT/US21/20421, May 20, 2021, 8 pages.
Wiseman, Sr., United States Statutory Invention Registration No. H1023, published Mar. 3, 1992, 7 pages.
Chemical Book, Bis(1,2,2,6,6-pentamethyl-4-piperidyl) sebacate, available online at least as of 2017, https://www.chemicalbook.com/ChemicalProductProperty_EN_CB8121619.htm, accessed online Mar. 15, 2022 (Year: 2017).
Pearson Dental, "UV Protection Face Shields", https://www.pearsondental.com/catalog/subcat_thumb.asp?majcatid=750&catid=10149, available online at least as of Jan. 27, 2021 per Internet Archive, accessed online on Sep. 15, 2021. (Year: 2021).
Patent Cooperation Treaty, International Search Report and Written Opinion for International Application No. PCT/US2022/031823, mailed Jul. 14, 2022, 11 pages.
Patent Cooperation Treaty, International Search Report and Written Opinion for International Application No. PCT/US2022/046171, mailed Jan. 18, 2023, 15 pages.
Patent Cooperation Treaty, International Search Report and Written Opinion for International Application No. PCT/US2023/012316, mailed Apr. 14, 2023, 11 pages.
Canadian Office Action for Application No. 3,138,155; mailed Nov. 24, 2025.
Patent Cooperation Treaty, International Search Report and Written Opinion for International Application No. PCT/US2023/26598, mailed Sep. 12, 2023, 7 pages.
State Intellectual Property Office, English translation of Second Examination Opinion Notice for Chinese Application No. 202080071482.3, Oct. 17, 2024, 18 pages.
State Intellectual Property Office, English translation of First Examination Opinion Notice for Chinese Application No. 202080071482.3, May 11, 2024, 22 pages.
European Patent Office, Extended European Search Report for European Application No. 20863965.8, Aug. 21, 2023, 8 pages.
European Patent Office, Communication pursuant to Article 94(3) EPC, Nov. 14, 2024, 4 pages.
Patent Cooperation Treaty, International Search Report and Written Opinion for International Application No. PCT/US2024/052837, mailed Nov. 14, 2024, 6 pages.
Canadian Intellectual Property Office, Office Action for Application No. 3,138,155, Dec. 19, 2024, 3 pages.

* cited by examiner

POLYMER SAFETY GLAZING FOR VEHICLES

CROSS-REFERENCE TO RELATED APPLICATIONS

This application is a continuation of U.S. application Ser. No. 18/182,274, filed Mar. 10, 2023, which is a continuation of U.S. application Ser. No. 17/664,018, filed May 18, 2022, now U.S. Pat. No. 11,833,790, issued Dec. 5, 2023, which is a continuation of U.S. application Ser. No. 16/819,526, filed Mar. 16, 2020, now U.S. Pat. No. 11,364,715, issued Jun. 21, 2022, which relates to and claims the benefit of U.S. Provisional Application No. 62/850,966, filed May 21, 2019, and entitled "POLYMER SAFETY GLAZING FOR VEHICLES," the entire contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to safety glazing and, more particularly, to polymer safety glazing for vehicle windows including windshields.

2. Related Art

Safety glazing has historically been made of glass. Glass has a hardness that can withstand scratching from windshield wipers and some amount of abrasive debris. It is also very economical and lends itself to mass production techniques. However, glass breaks easily and can present dangerous sharp pieces that can lacerate passengers, causing personal injuries. This problem has been mitigated to a point by tempering, causing the glass to break into small pieces (½"), and by laminating two glass pieces together with a flexible polymer polyvinylbutyral (PVB) core between them in an attempt to hold the small fragments together.

Unfortunately, glass safety glazing is susceptible to pitting by small aggregates and dust in the air, causing obscured vision while traveling toward the sun. Over 15 million glass windshields are replaced each year for pitting and breaking in the USA alone. Moreover, laminated glass-PVB-glass windshields cannot be recycled because the PVB core contaminates the glass.

Considering the drawbacks of glass safety glazing, laceration of passengers remains a longstanding problem with no ideal solution. For example, 30 years of research has attempted to place a polymer coating or layer on the interior of a glass windshield without any commercial success.

Polycarbonate exhibits superior impact resistance and is used for vehicle glazing in auto racing and off-road vehicles. However, polycarbonate is so soft a material that it scratches and pits too easily for use in commercial or public vehicles. To date, there is no available direct hard coating to overcome these durability issues. Therefore, polycarbonate windshields are currently restricted to motorcycles on public roads. For example, Saudi Basic Industries Corporation (SABIC) is the producer of LEXAN branded polycarbonate. In their 2016 Department of Transportation (DOT) Guidebook regarding LEXAN sheet products, they state, "Except for motorcycle windshields, SABIC's thermoplastics materials generally cannot be used for forward facing exterior glazing . . . ."

BRIEF SUMMARY

The present disclosure contemplates various systems and methods for overcoming the above drawbacks accompanying the related art. One aspect of the embodiments of the present disclosure is a laminate including a polycarbonate substrate and an ultraviolet hard coat film disposed on the polycarbonate substrate. The ultraviolet hard coat film may include a polyethylene terephthalate (PET) layer, an adhesive interposed between the PET layer and the polycarbonate substrate, and an exterior hard coat disposed on the PET layer opposite the polycarbonate substrate. The exterior hard coat, the PET layer, and/or the adhesive may include UV stabilizers.

The polycarbonate substrate may be 3-8 mm thick. The PET layer may be 2-6 mil thick. The exterior hard coat may be 2-10 microns thick. The exterior hard coat may have a gouge pencil hardness of greater than 8H. The adhesive may be a pressure sensitive adhesive.

The laminate may include an interior hard coat disposed on the polycarbonate substrate opposite the PET layer. The interior hard coat may have a gouge pencil hardness of 6H to 8H.

The ultraviolet hard coat film may be a first of a plurality of ultraviolet hard coat films stacked on the polycarbonate substrate. The plurality of ultraviolet hard coat films may include a second ultraviolet hard coat film disposed on the first ultraviolet hard coat film, the second ultraviolet hard coat film including a second PET layer, a second adhesive interposed between the second PET layer and the first ultraviolet hard coat film, and a second exterior hard coat disposed on the second PET layer opposite the first ultraviolet hard coat film. The second exterior hard coat, the second PET layer, and/or the second adhesive may include UV stabilizers. The adhesive of the first ultraviolet hard coat film may be stronger than the second adhesive.

The laminate may be thermoformed into the shape of a curved vehicle windshield.

Another aspect of the embodiments of the present disclosure is a method. The method may include depositing a UV stabilized hard coat on a first side of a polyethylene terephthalate (PET) carrier, coating a second side of the PET carrier, opposite the first side, with an adhesive, and adhering the second side of the PET carrier to a polycarbonate substrate using the adhesive.

The PET carrier, the UV stabilized hard coat, and the adhesive may define an ultraviolet hard coat film. The method may include winding the ultraviolet hard coat film on a roll prior to adhering the second side of the PET carrier to the polycarbonate substrate. The method may include applying a removable liner to the second side of the PET carrier after the coating. The method may include removing the removable liner from the second side of the PET carrier prior to adhering the second side of the PET carrier to the polycarbonate substrate. The method may include thermoforming the polycarbonate substrate with the adhered ultraviolet hard coat film to the shape of a curved vehicle windshield.

The PET carrier, the UV stabilized hard coat, and the adhesive may define a first ultraviolet hard coat film. The method may include depositing a second UV stabilized hard coat on a first side of a second PET carrier, coating a second side of the second PET carrier, opposite the first side, with a second adhesive, and adhering the second side of the second PET carrier to the first ultraviolet hard coat film using the second adhesive. The adhesive of the first ultraviolet hard coat film may be stronger than the second adhesive. The second PET carrier, the second UV stabilized hard coat, and the second adhesive may define a second ultraviolet hard coat film.

The method may include thermoforming the polycarbonate substrate with adhered first and second ultraviolet hard coat films to the shape of a vehicle windshield. The method may include peeling off the second ultraviolet hard coat film to reveal the first ultraviolet hard coat film. The method may include depositing a new second UV stabilized hard coat on a first side of a new second PET carrier, coating a second side of the new second PET carrier, opposite the first side, with a new second adhesive, and adhering the second side of the new second PET carrier to the first ultraviolet hard coat film using the new second adhesive.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of a laminate for use as a vehicle windshield and a manufacturing method thereof. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that relational terms such as first and second and the like are used solely to distinguish one from another entity without necessarily requiring or implying any actual such relationship in order between such entities.

Figure 1:
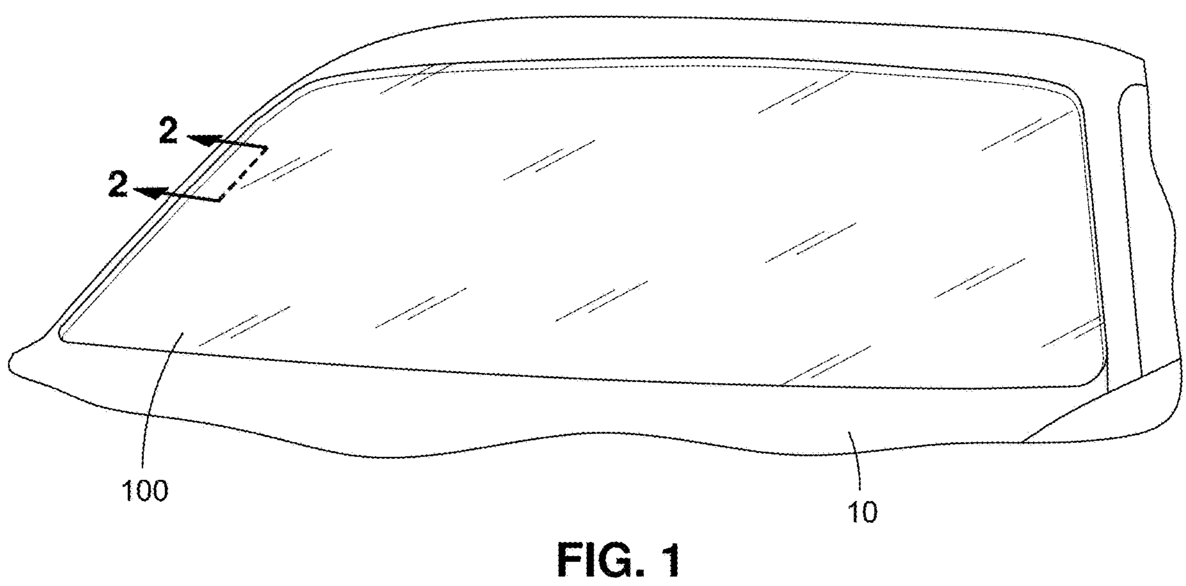
FIG. 1 shows a laminate that is thermoformed into the shape of a vehicle windshield and installed in a vehicle according to an embodiment of the present disclosure.
Figure 2:
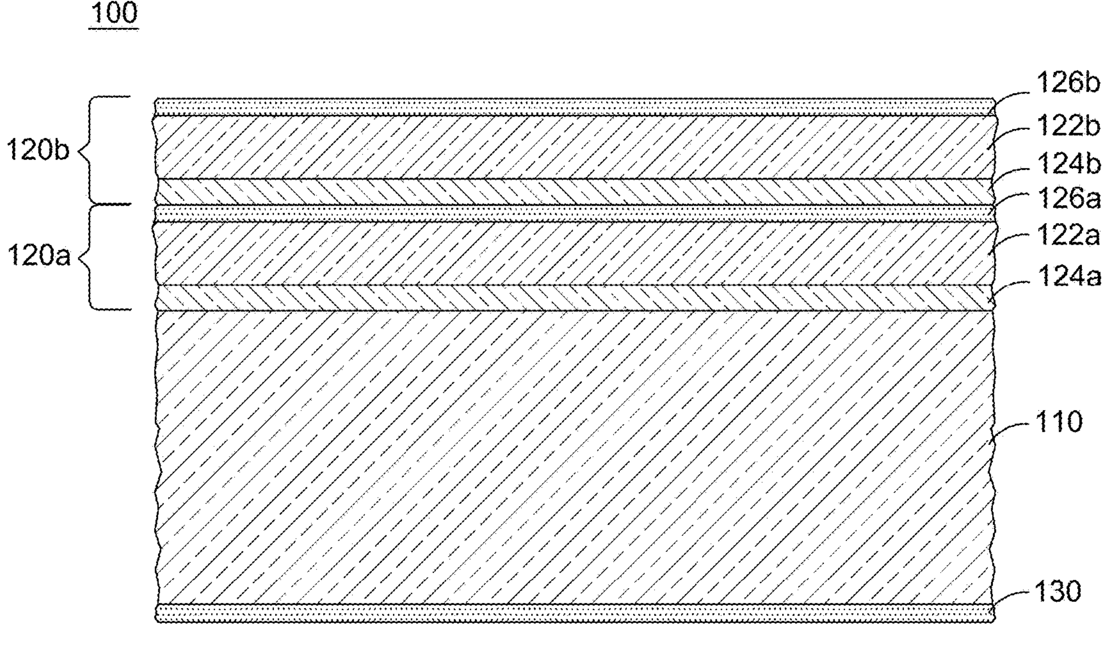
FIG. 2 is a cross-sectional view of the laminate taken along the line 2-2 in FIG. 1.

FIG. 1 shows a laminate 100 that is thermoformed into the shape of a vehicle windshield and installed in a vehicle 10 according to an embodiment of the present disclosure. FIG. 2 is a cross-sectional view of the laminate 100 taken along the line 2-2 in FIG. 1. As shown in FIG. 2, the laminate 100 may including a polycarbonate substrate 110 and one or more ultraviolet hard coat films 120 (120*a*, 120*b*, etc.) disposed on the polycarbonate substrate 110. By disposing the one or more ultraviolet hard coat films 120 on the polycarbonate substrate 110, the polycarbonate substrate 110 can be protected from scratching and pitting by windshield wipers and debris during use. In this way, the laminate 100 may combine the impact resistance of polycarbonate with the durability needed for widespread vehicle use, all while avoiding the safety hazards associated with glass windshields.

Unlike prior attempts to apply hard coating to polycarbonate, the ultraviolet hard coat film 120*a* includes a polyethylene terephthalate (PET) layer 122*a* serving as a carrier, which may be adhered to the polycarbonate substrate 110 by an adhesive 124*a* interposed therebetween. A UV stabilized exterior hard coat 126*a* may be disposed on the PET layer 122*a* opposite the polycarbonate substrate 110, with the PET layer 122*a*, adhesive 124*a*, and exterior hard coat 126*a* defining the ultraviolet hard coat film 120*a*. The exterior hard coat 126*a* may have a gouge pencil hardness of greater than 8H, making the laminate 100 far more durable than the polycarbonate substrate 110 would be alone. By using the PET layer 122*a* as a carrier, the exterior hard coat 126*a* can be applied without the difficulties that would arise if one were to attempt to apply the exterior hard coat 126*a* to the polycarbonate substrate 110 directly. For example, the polycarbonate substrate 110 may be too soft to support the hard coat 126*a*, the difference in thermal expansion coefficient between the polycarbonate substrate 110 and the hard coat 126*a* may cause the hard coat 126*a* to fracture over time, and/or the hydrophilic quality of the polycarbonate substrate 110 may cause absorbed water to lift the hard coat 126*a*. These concerns may be avoided by applying the hard coat 126*a* to the PET layer 122*a* and allowing the PET layer 122*a* to “float” on the polycarbonate substrate 110 with the adhesive 124*a* interposed therebetween.

As shown in the example of FIG. 2, the ultraviolet hard coat film 120*a* may be a first of a plurality of ultraviolet hard coat films 120 (120*a*, 120*b*, etc.) stacked on the polycarbonate substrate 110. By way of example, a second ultraviolet hard coat film 120*b* may include and be defined by a PET layer 122*b*, an adhesive 124*b*, and an exterior hard coat 126*b*, which may be the same as the PET layer 122*a*, adhesive 124*a*, and exterior hard coat 126*a*, respectively, except that the adhesive 124*b* may be interposed between the PET layer 122*b* and the first ultraviolet hard coat film 120 (e.g. the exterior hard coat 126*a* thereof). Additional (e.g. third, fourth, etc.) ultraviolet hard coat films 120 may be applied in the same way. When a laminate 100 having more than one ultraviolet hard coat film 120 becomes unacceptably degraded over time during the life of the vehicle windshield or other window (e.g. due to chips, oxidation, etc.), the outermost ultraviolet hard coat film 120 may simply be peeled off and removed, revealing the fresh ultraviolet hard coat film 120 beneath. To this end, the adhesive 124*a* of the first ultraviolet hard coat film 120*a* may be stronger than the adhesive 124*b* etc. used for additional ultraviolet hard coat films 120 (and in some cases the adhesives 124*b* etc. may have further decreasing strength with each additional ultraviolet hard coat film 120). In this way, the first ultraviolet hard coat film 120*a* may remain adhered to the polycarbonate substrate 110 while another ultraviolet hard coat film 120 is peeled off. It is contemplated, for example, that the first ultraviolet hard coat film 120*a* may be intended to remain on the polycarbonate substrate 110 for the life of the laminate 100, with additional hard coat films 120 being removable (and possibly replenishable as described below) as needed. Along the same lines, each such additional ultraviolet hard coat film 120 beyond the first 120*a* may be provided with a tab or other means for easy peel-away during the life of the laminate 100.

The PET layer 122*a* of the ultraviolet hard coat film 120*a* may be 2-6 mil thick (1 mil=1 thousandth of an inch) and may be, for example, a biaxially-oriented polyethylene terephthalate (BoPET) sold under the registered trademark Mylar owned by the DuPont Company. The exterior hard coat 126*a* may be 2-10 microns (e.g. 5 microns) thick and may be, for example, a UV-curable polysiloxane-acrylic hybrid resin, such as a UV-curable resin marketed by DIC Corporation. In addition to having a gouge pencil hardness of greater than 8H, the exterior hard coat 126*a* may pass the abrasion test #18 specified in the American National Standards Institute (ANSI) Z26.1-1996 standard and the one-year weather test #16 specified in the ANSI Z26.1-1996 standard. As noted above, the exterior hard coat 126*a* may be UV-stabilized, for example, by the inclusion of UV stabilizers such as hydroxyphenyl-benzotriazole or hydroxyphenyl-triazine UV absorbers. By including UV stabilizers in the exterior hard coat 126*a*, degradation of the PET carrier 122*a* and adhesive 124*a* caused by ultraviolet radiation in sunlight (e.g. yellowing or becoming brittle) can be prevented or slowed during the life of the ultraviolet hard coat film 120*a*. It is contemplated that UV stabilizers may be additionally or alternatively included in the PET carrier 122*a* and/or the adhesive 124*a*. The adhesive 124*a* may be 10-25 microns (e.g. 25 microns) thick and may be, for example, a pressure sensitive adhesive (PSA) such as a low tack PSA having a peel strength determined as a constant load per unit width needed for peeling of about 30 grams per inch. The components of any additional ultraviolet hard films 120 beyond the first ultraviolet hard coat film 120*a* may have the same or similar specifications. The underlying polycarbonate substrate 110 may be 3-8 mm (e.g. 4 mm) thick.

As shown in FIG. 2, the laminate 100 may further include an interior hard coat 130 disposed on the polycarbonate substrate 110 opposite the PET layer 122*a*. Because the interior hard coat 130 will be the inward-facing surface of the windshield, it will not be subject to the same abrasions and impacts as the exterior hard coat 126*a* and need not be held to the same standards. As such, the interior hard coat 130 may be softer than the exterior hard coat 126*a*, thus mitigating the difficulties discussed above with respect to directly applying the exterior hard coat 126*a* to the polycarbonate substrate 110. The interior hard coat 130 may have a gouge pencil hardness of only 6H to 8H, for example. The interior hard coat 130 need not necessarily pass the abrasion test #13 specified in the ANSI Z26.1-1996 standard or the one-year weather test #16 specified in the ANSI Z26.1-1996 standard. Like the exterior hard coat 126*a*, the interior hard coat 130 may be 2-10 microns (e.g. 5 microns) thick and may be, for example, a UV-curable polysiloxane-acrylic hybrid resin, such as a UV-curable resin marketed by DIC Corporation. Because it will not be exposed directly to sunlight, the interior hard coat 130 may or may not have UV stabilizers.

Figure 3:
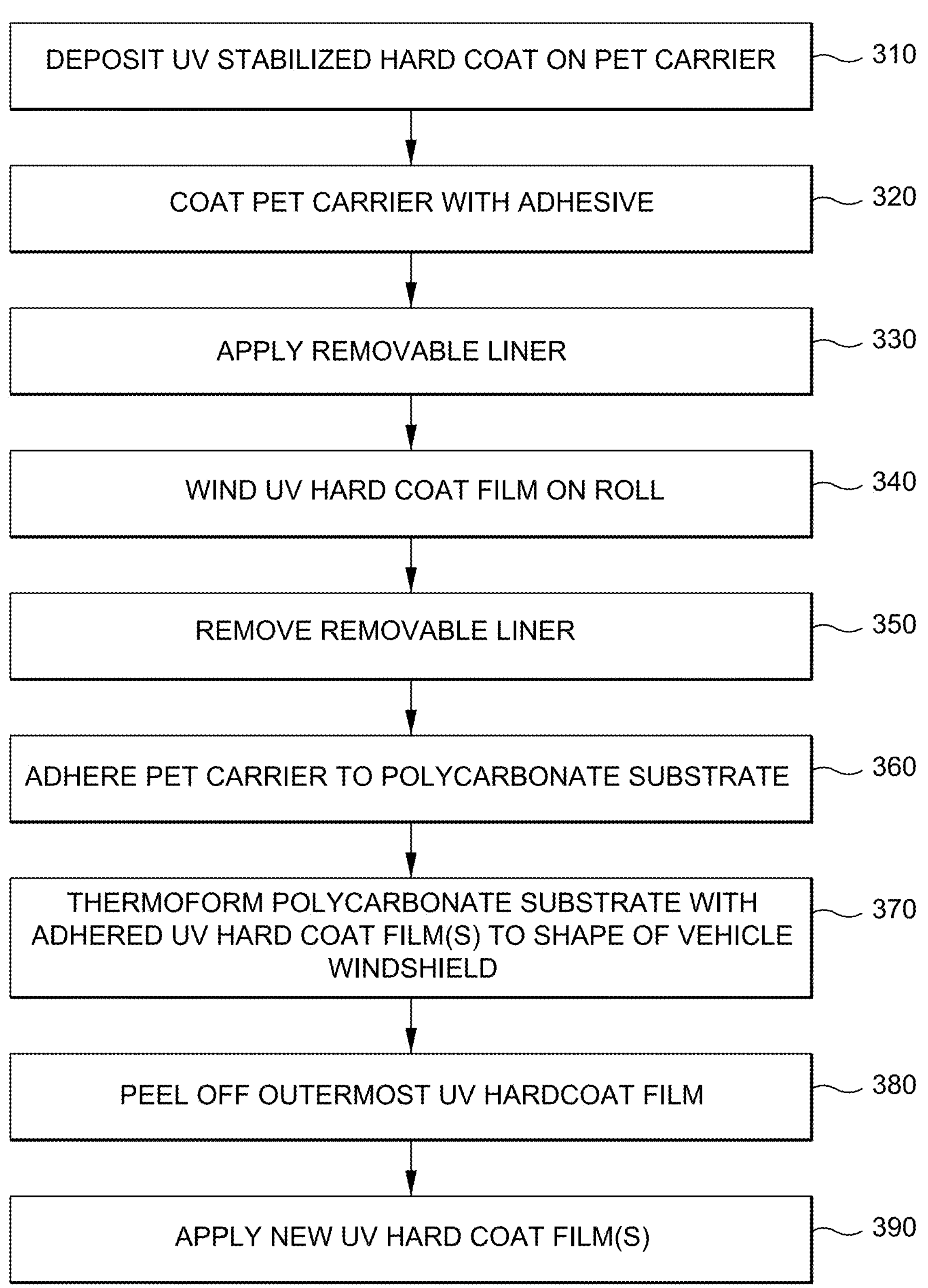
FIG. 3 shows an example operational flow according to an embodiment of the present disclosure.

FIG. 3 shows an example operational flow according to an embodiment of the present disclosure. The operational flow may begin with depositing a UV stabilized hard coat that will serve as an exterior hard coat 126*a* on a first side of a PET carrier 122*a* (step 310). The exterior hard coat 126*a* is preferably wet deposited onto the PET carrier 122*a* but may be applied according to any appropriate methods including spin coating, dip coating, or vacuum deposition. Before or after the exterior hard coat 126*a* is applied, the PET carrier 122*a* may be coated on the opposite side with the adhesive 124*a* (step 320). These three elements, the PET carrier 122*a*, adhesive 124*a*, and exterior hard coat 126*a*, may be permanently bonded to each other and can be collectively regarded as the ultraviolet hard coat film 120*a*. Once the adhesive 124*a* is coated on the PET carrier 122*a*, a removable liner may be applied to the same side of the PET carrier 122*a* to protect the adhesive 124*a* (step 330). The ultraviolet hard coat film 120*a* may then be wound on a roll to form a roll-to-roll processing web that may be about 2 meters wide (step 340). The operational flow of steps 310-340 may produce a roll of the ultraviolet hard coat film 120*a* at a rate of about 30 meters per minute.

As the ultraviolet hard coat film 120*a* is unwound from the roll, the removable liner may be removed to expose the adhesive 124*a* (step 350), and the PET carrier 122*a* may be adhered to the polycarbonate substrate 110 by the exposed adhesive 124*a* (step 360). For example, the ultraviolet hard coat film 120*a* may be dry nipped to the flat polycarbonate substrate 110 by rollers. With the ultraviolet hard coat film 120*a* having been adhered to the polycarbonate substrate 110, the laminate 100 may be ready for thermoforming to the desired final shape of the windshield or other window. However, as described above and shown in FIG. 2, the laminate 100 may include additional ultraviolet hard coat films 120*b*, etc., which may later be peeled off one at a time as they degrade with use. In this case, steps 310-360 may be repeated for each additional ultraviolet hard coat film 120, except that each subsequent ultraviolet hard coat film 120 is adhered to the preceding ultraviolet hard coat film 120 of the stack rather than to the polycarbonate substrate 110 in step 360. Once the desired number of ultraviolet hard coat films 120 is stacked on the polycarbonate substrate 110, the entire laminate 110 including the polycarbonate substrate 110 and one or more adhered ultraviolet hard coat films 120 may be 2D or 3D thermoformed to create the windshield or other window (step 370). The thermoforming temperature may be typically about 180 degrees Celsius and may utilize a windshield-shaped pattern or mold surface to form a properly sized 2D or 3D shaped vehicle windshield for installation in a vehicle 10 (see FIG. 1).

As explained above, it is contemplated that a laminate 100 having more than one ultraviolet hard coat film 120 may allow for the outermost ultraviolet hard coat film 120 to be peeled off and removed to reveal a fresh ultraviolet hard coat film 120 beneath. In this respect, the operational flow of FIG. 3 may continue during the life of the laminate 100 that has been installed in a vehicle 10. When the outermost ultraviolet hard coat film 120 becomes unacceptably degraded over time, it may be peeled off to reveal the next ultraviolet hard coat film 120 underneath (step 380).

Following removal of one or more ultraviolet hard coat films 120 in step 380, it is further contemplated that the set of ultraviolet hard coat films 120 may in some cases be replenished to avoid any degradation to the first, innermost ultraviolet hard coat film 120*a* and prolong the life of the laminate 100. It is envisioned that this first ultraviolet hard coat film 120*a* would generally not be removed, as doing so would expose the softer polycarbonate substrate 110 which may not conform to the same standards for use in the vehicle 10. As such, the operational flow of FIG. 3 may include a step of applying one or more new ultraviolet hard coat films 120 to the first ultraviolet hard coat film 120*a* or to the remaining stack of ultraviolet hard coat films 120 (step 390). For example, steps 310-360 may be performed for each additional new ultraviolet hard coat film 120, except that, in step 360, the new ultraviolet hard coat film(s) 120 may be added to the laminate 100 while the laminate 100 is already installed in the vehicle 10 and thus after it has been thermoformed. This may be done, for example, by wet laminating the new ultraviolet hard coat film(s) 120 to the stack and shrinking them with a heat gun or blow dryer to conform them to the existing shape of the laminate 100 while applying pressure using a card or squeegee. In some cases, such additional ultraviolet hard coat film(s) may be applied using a sacrificial layer serving as a female mold cavity as described in commonly owned U.S. application Ser. No. 16/778,928, filed Jan. 31, 2020 and entitled "THERMOFORM WINDSHIELD STACK WITH INTEGRATED FORMABLE MOLD," the entire contents of which is expressly incorporated herein by reference.

At the end of the life of the laminate 100, there is no contamination as in the case of conventional laminated glass-PVB-glass windshields. Thus, the polycarbonate substrate 110 can easily be recycled, resulting in less waste and benefitting the environment.

In the above examples of the laminate 100, it is assumed that at least one ultraviolet hard coat film 120 is adhered to the polycarbonate substrate 110 prior to thermoforming into the desired shape of the windshield or other window. However, the disclosure is not intended to be so limited, and it is contemplated that the one or more ultraviolet hard coat films 120 may be applied after the polycarbonate substrate 110 is already thermoformed. For example, the same techniques described above in relation to replenishing the stack of ultraviolet hard coat films 120 in step 390 may be used to apply the original one or more ultraviolet hard coat films 120.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A laminate comprising:

a polycarbonate substrate;

a stack of one or more polyethylene terephthalate (PET) films disposed on the polycarbonate substrate, the stack of one or more PET films including an exterior hard coat opposite the polycarbonate substrate; and an interior hard coat disposed on the polycarbonate substrate opposite the stack of one or more PET films, the interior hard coat being softer than the exterior hard coat.

2. The laminate of claim 1, wherein the polycarbonate substrate is 3-8 mm thick.

3. The laminate of claim 1, wherein each of the one or more PET films is 2-6 mil thick.

4. The laminate of claim 1, wherein the exterior hard coat is 2-10 microns thick.

5. The laminate of claim 1, further comprising a first adhesive between the stack of the one or more PET films and the polycarbonate substrate.

6. The laminate of claim 5, wherein the first adhesive is a pressure sensitive adhesive.

7. The laminate of claim 5, further comprising a second adhesive between first and second PET films from among the one or more PET films.

8. The laminate of claim 7, wherein the first adhesive is stronger than the second adhesive.

9. The laminate of claim 1, wherein the laminate is thermoformed into the shape of a curved vehicle windshield.

10. A laminate comprising:

a polycarbonate substrate;

a stack of one or more polyethylene terephthalate (PET) films adhered to the polycarbonate substrate by an adhesive, the stack of one or more PET films including an exterior hard coat opposite the polycarbonate substrate; and an interior hard coat disposed on the polycarbonate substrate opposite the stack of one or more PET films, the interior hard coat being softer than the exterior hard coat.

11. A method comprising:

disposing a first hard coat on a stack of one or more polyethylene terephthalate (PET) films;

disposing the stack of one or more PET carriers on a first side of a polycarbonate substrate; and disposing a second hard coat on a second side of the polycarbonate substrate opposite the first side, the second hard coat being softer than the first hard coat.

12. The method of claim 11, further comprising winding a film including one of the one or more PET films and the first hard coat on a roll.

13. The method of claim 11, further comprising thermoforming the polycarbonate substrate with the stack of one or more PET films disposed thereon to the shape of a curved vehicle windshield.

14. The method of claim 11, wherein said disposing the stack of one or more PET carriers on the first side of the polycarbonate substrate comprises adhering the stack of one or more PET films to the first side of the polycarbonate substrate using a first adhesive provided on the stack.

15. The method of claim 14, further comprising applying a removable liner to the first adhesive.

16. The method of claim 14, wherein a second adhesive is provided between first and second films from among the one or more PET films.

17. The method of claim 16, wherein the first adhesive is stronger than the second adhesive.

18. The method of claim 16, further comprising thermoforming the polycarbonate substrate with the stack of one or more PET films including the first and second films to the shape of a vehicle windshield.

19. The method of claim 18, further comprising peeling off the second film to reveal the first film.

20. The method of claim 19, further comprising adhering a new second film to the first film using the second adhesive.

* * * * *